Jan. 10, 1967  A. L. DE LISLE  3,297,410
COUNTERCURRENT ROTARY LEACHER WITH SPIRAL
SCOOP SOLIDS CONVEYORS
Filed Nov. 9, 1965  5 Sheets-Sheet 3
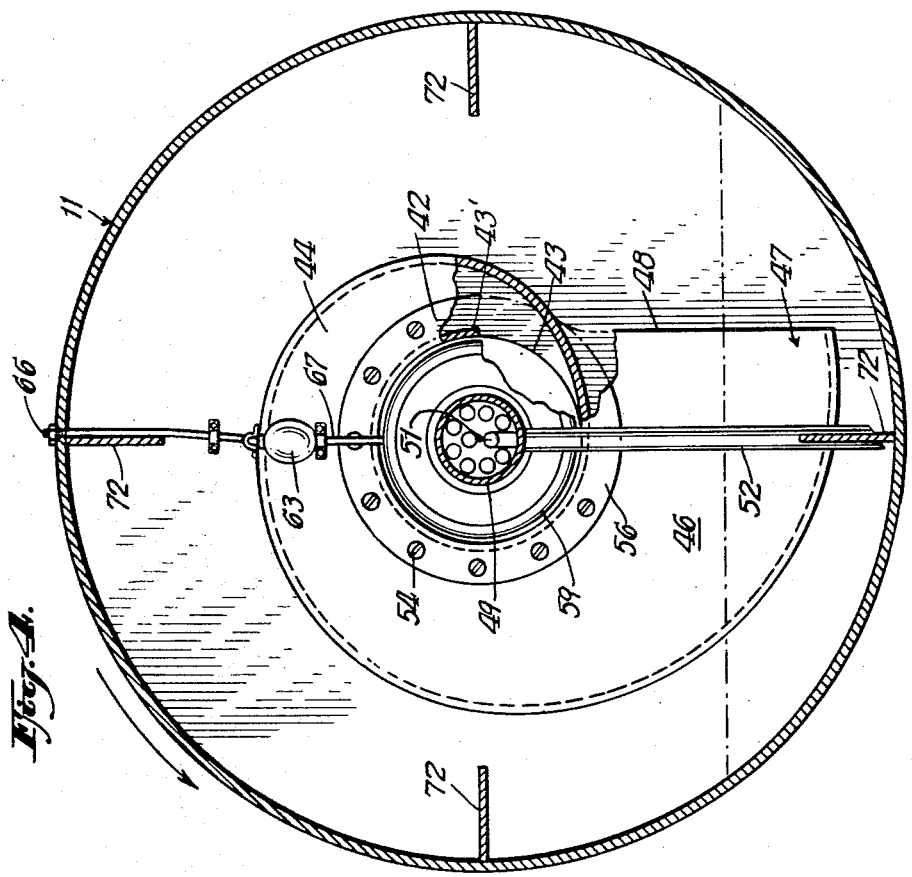
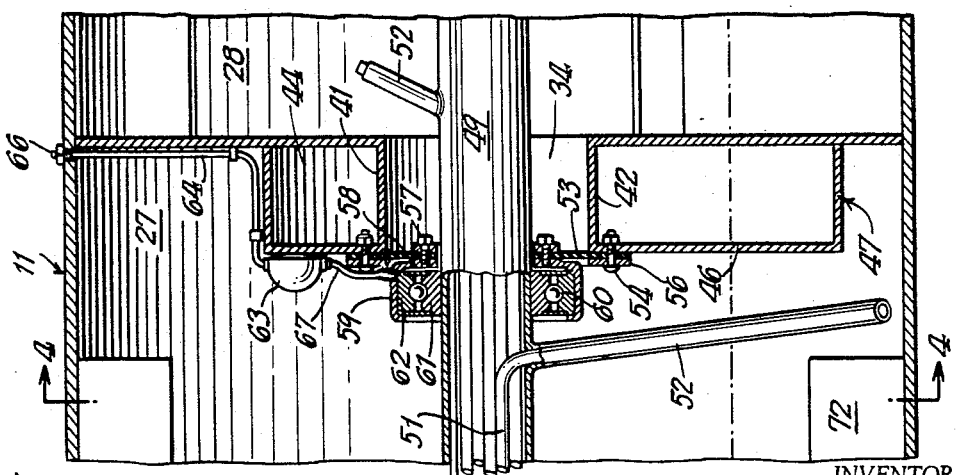
INVENTOR.
AUGUSTE LOUIS DE LISLE, DECEASED,
BY FRANCES S. DE LISLE, EXECUTRIX
BY
ATTORNEY.

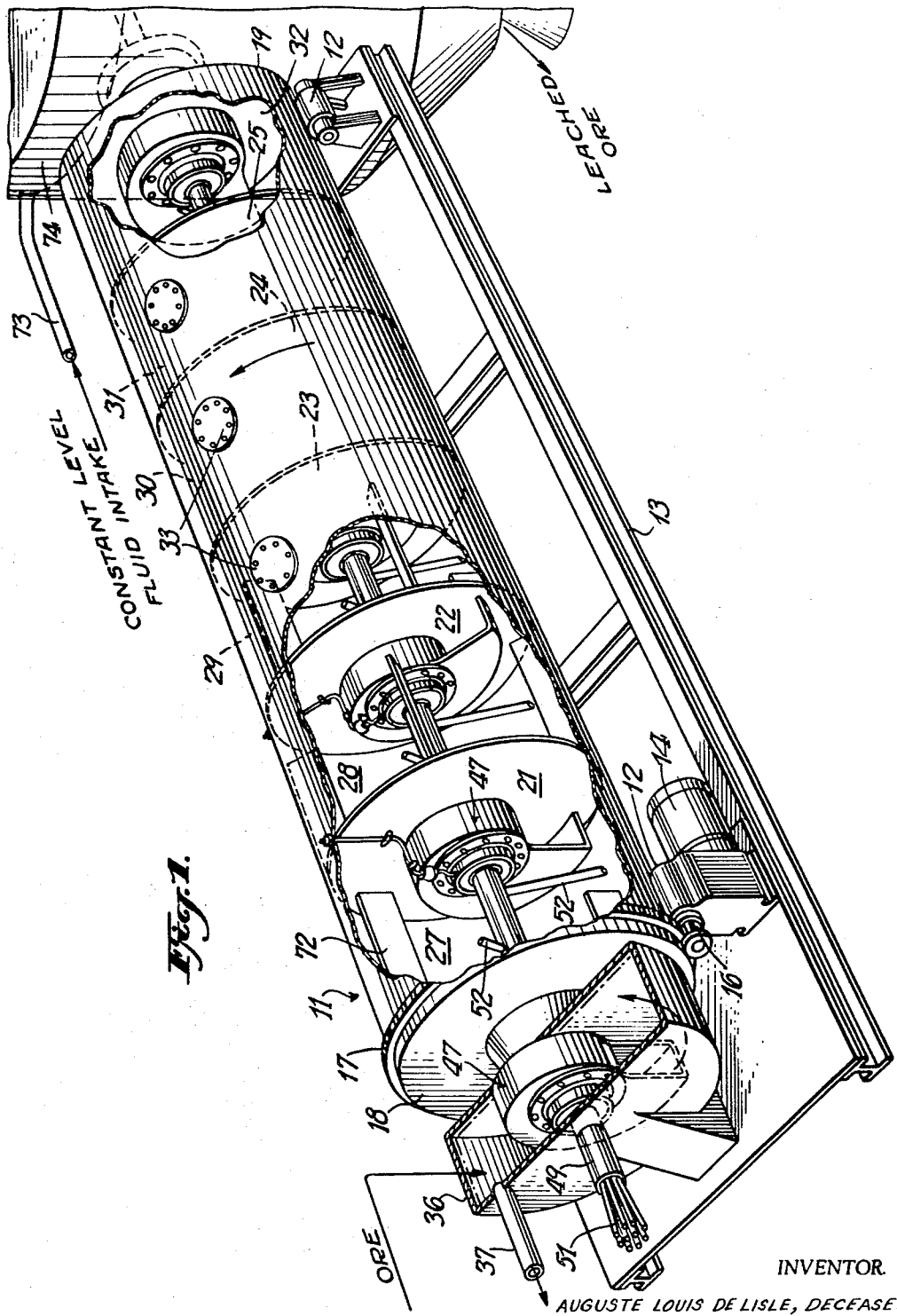
Fig. 1.
INVENTOR.
AUGUSTE LOUIS DE LISLE, DECEASED,
BY FRANCES S. DE LISLE, EXECUTRIX
ATTORNEY.

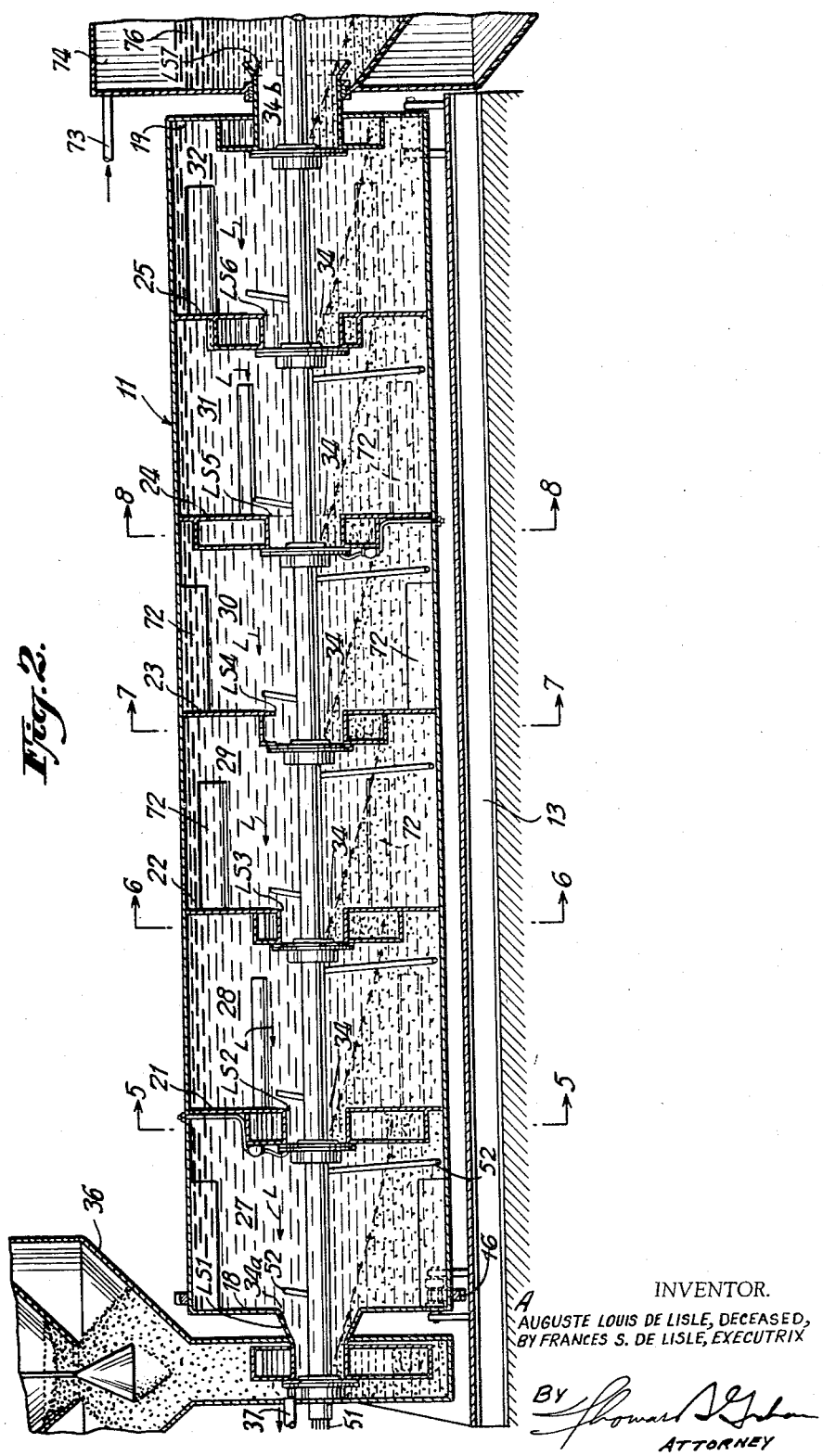

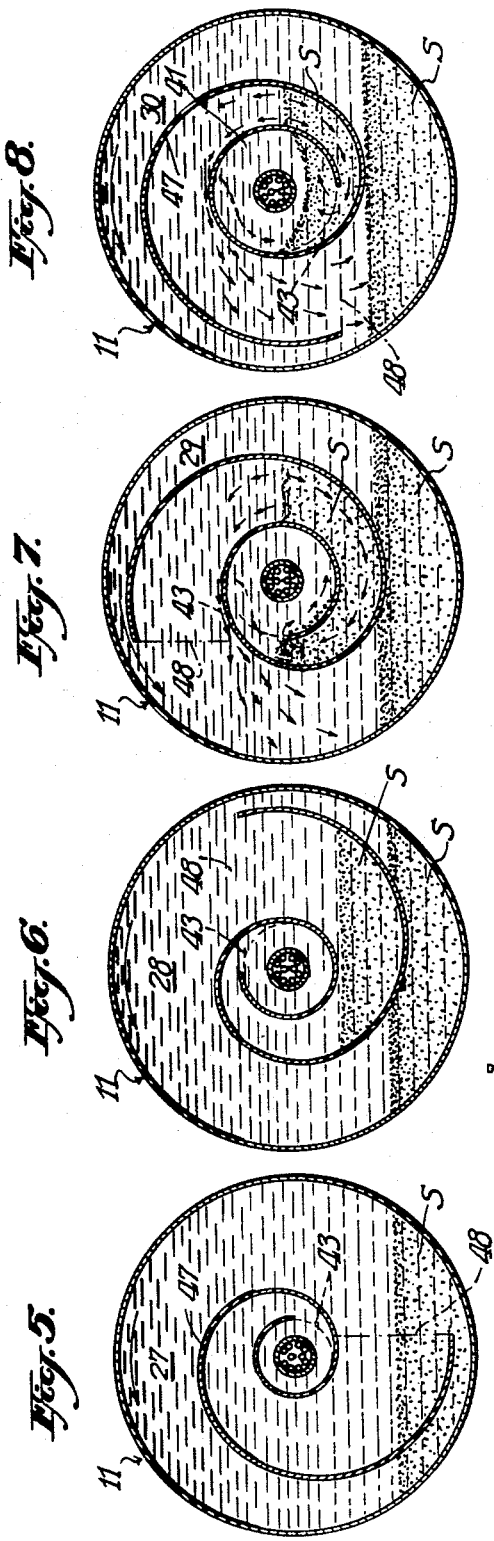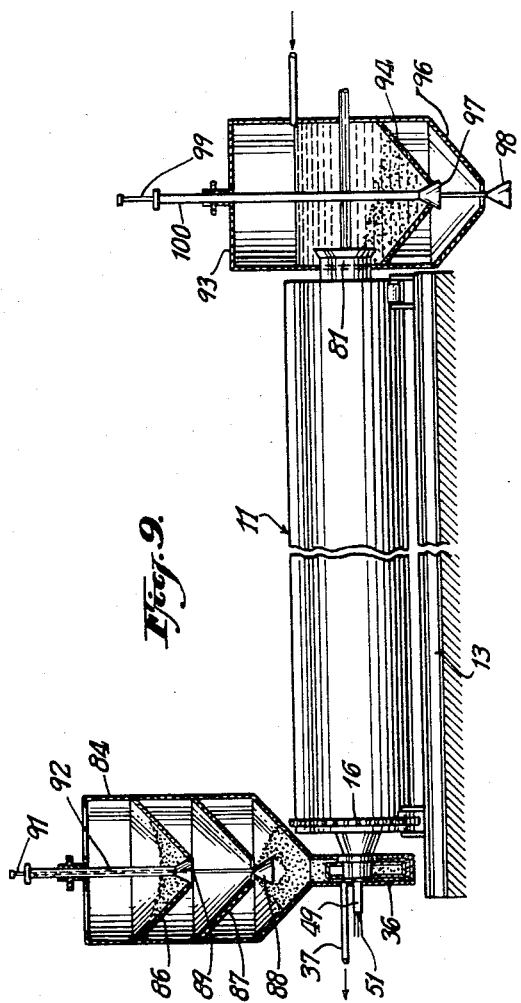

Jan. 10, 1967 A. L. DE LISLE 3,297,410
COUNTERCURRENT ROTARY LEACHER WITH SPIRAL
SCOOP SOLIDS CONVEYORS
Filed Nov. 9, 1965 5 Sheets-Sheet 5

INVENTOR.
AUGUSTE LOUIS DE LISLE, DECEASED,
BY FRANCES S. DE LISLE, EXECUTRIX

BY
ATTORNEY.

United States Patent Office 3,297,410
Patented Jan. 10, 1967

3,297,410
COUNTERCURRENT ROTARY LEACHES WITH SPIRAL SCOOP SOLIDS CONVEYORS
Auguste Louis de Lisle, deceased, late of Scottsdale, Ariz., by Frances S. de Lisle, executrix, Scottsdale, Ariz., assignor to University of Arizona Foundation, Tucson, Ariz.
Filed Nov. 9, 1965, Ser. No. 506,988
6 Claims. (Cl. 23—269)

This application is a continuation-in-part of my co-pending application, Serial No. 356,139, filed March 31, 1964 now abandoned, in turn a continuation-in-part of Serial No. 91,108, filed February 23, 1961 now abandoned.

This invention relates to process and apparatus for carrying out chemical and/or physical reactions and, more particularly, to process and apparatus for effecting leaching of ores with liquids in a multiplicity of cells or chambers in which different conditions, such, for example, as pH, temperature, gaseous atmospheres, etc. are maintained. By physical reactions is meant the effecting of dissolution of solid constituents in a liquid solvent, the leaching of constituents from ores or other materials by a liquid, etc.

A more important field of application of this invention is in the chemical processing of ores to effect extraction therefrom of desired metal constituents, such, for example, as the recovery of manganese in the form of manganese sulfate or manganese dithionate or mixtures of such manganese salts from ores containing manganese oxides. Such recovery procedures involve the treatment of the ore particles under successively different process conditions, such, for example, as extraction or leaching under successively different pH conditions, and under different gaseous atmospheres in the respective stages, including an oxidizing atmosphere in one or more stages. Accordingly, the present description will be confined chiefly to this illustrative embodiment of the invention. It will be appreciated, however, that the invention is not limited to leaching techniques, but is generally applicable to the processing of solid materials with liquids.

The leaching of solids by the countercurrent flow of solids such as ore through a number of side by side cells in a rotating drum and the flow of liquid in the opposite direction through these cells is well known and is disclosed, for example, in United States Patent 1,353,463 of September 21, 1920 and United States Patent 3,005,690 of October 24, 1961. The latter patent discloses a countercurrent leaching apparatus developed by the Bureau of Mines involving a multiplicity of contiguous side by side cells positioned in a rotating drum, the opposite sides of the cells being defined by partitions or bulkheads having central openings therein so that each cell is in communication with the adjacent cell through this central opening. Ore to be processed is supplied at one end of the drum and liquid at the opposite end. The ore flows from cell to cell through the central openings separating contiguous cells upon rotation of the drum and residual or denuded solids exit from the end of the drum where the liquid is introduced. The liquid flows in a countercurrent direction to that of the ore from cell to cell through the central openings connecting adjacent cells and the pregnant solution exits from the end of the drum where the ore is introduced.

In all such known leaching equipment the transfer of solids from each compartment to an adjacent compartment is accompanied by the transfer of accompanying entrained liquid and whatever dissolved values of reagents which said liquid may contain. It is therefore difficult to maintain in selected cells of the same drum different processing conditions owing to the fact that the entrained liquid moves in a direction in the drum opposite to the main solution flow. This leads to back mixing and intermingling of dissolved products and reagents.

It is a principal object of the present invention to provide process and apparatus for carrying out chemical and/or physical reactions between solids and liquids or solutions which can take part in the reaction, employing a multiplicity of rotating cells in side by side relation in a drum with the flow of solids from one cell to and through adjacent cells, the flow of liquids from one cell to and through adjacent cells, but not necessarily all of the cells in the drum, and with the maintenance of different gaseous atmosphere in two or more of the cells, the flow of solids and liquids being effected efficiently by the rotation of the drum from cell to cell and this without interfering with the maintenance of the desired chemical environment, including different gaseous atmospheres, in the individual cells of the drum.

It is another object of this invention to provide a process for effecting extraction or leaching of desired values from ores and other solid materials by flowing the solid from cell to cell in a drum containing a series of the cells in side by side relation and flowing liquid from cell to cell in the drum, preferably in a countercurrent direction to the direction of flow of solids, each cell communicating with its adjacent cell of the series and the end cells communicating with the exterior of the drum through liquid seals through which, in the case of the end cells, solids and liquids are introduced thereinto and, in the case of the remaining cells, flow of both solids and liquids takes place from cell to cell, the liquid seals enabling the movement of solids between adjacent cells substantially free of entrained solution and the movement of solution between adjacent cells in a direction opposite to that of the movement of the solids.

It is still another object of this invention to provide an apparatus in which dissolved substances entrained within pulps obtained by leaching ores or concentrates may be removed and recovered in the most concentrated form as a pregnant solution and with the least amount of wash water. This is accomplished ordinarily in filtration equipment in which wash water is drawn or forced through a filter cake thereby displacing the entrained solution with the wash.

Filters are relatively expensive and their performance may be affected adversely by the tendency of some cakes to crack and short circuit the wash water. Also the cake or the filter cloth may become clogged with fine particles with a resultant reduction of capacity.

The alternative to filtration is countercurrent decantation in which a pulp is containing entrained solution mixed with water or with a more dilute solution. The slurry obtained is thickened to produce an underflow which contains less dissolved values than the original pulp. The process may be repeated in a sequence of steps to produce a nearly barren pulp and a pregnant solution from the original pulp and water.

Removal and recovery of dissolved values in countercurrent decantation is characterized by single stage or multistage dilution. In this invention this removal is by a process of displacement wherein the water or dilute solution enters the interstitial space of the pulp and displaces the solution which was there.

In contrast with the washing of a filter cake in which the cake is stationary while the wash solution flows through the interstitial space the solids in the practice of this invention are caused to cascade gently while the wash solution is caused to flow through the interstitial space. There is thus no opportunity given for short circuiting due to cracking or from any other cause.

In the practice of this invention the cascading motion is generated independently of the interstitial flow of wash solution through the pulp. This is in contrast with the fluidization technique in which the fluid which permeates the bed is responsible for the cascading motion of the particles.

The apparatus which embodies the principle of this invention is characterized by a multicompartmented drum, each compartment communicating with each adjacent compartment by means of an axially centered opening. Wash liquid enters at one end compartment of the drum and flows at the same rate into the second compartment of the series and similarly in each of the compartments of the drum.

The apparatus which embodies the principle of this invention is characterized also by a spiral scoop which is attached to an end wall of each compartment, said scoop constructed so as to pick up a portion of the particulate solids which are contained in said compartment and cause the solids to be discharged through the axially centered opening into that adjacent second compartment which is upstream from said first compartment. A similar spiral scoop discharges a portion of the particulate solids from said second compartment into an adjacent third compartment, etc.

Each spiral scoop is, in accordance with the principles of this invention, characterized by a pair of side walls which form with the spiral element a labyrinthine path from the outer lip which picks up the particulate solids to the inner discharge through the axially centered opening. The spiral scoop is characterized moreover by having no communication means with either of the adjacent compartments except for the communication at the beforementioned outer lip with the one compartment and at the inner axially centered opening with the other.

The configuration of the spiral element of the scoop is, in accordance with this invention, such that, in combination with the depth of particulate solids in each compartment at least a portion of the labyrinthine path is filled across its entire section with dense pulp so that the counterflowing liquid must pass through at least a part of the interstitial space of the dense pulp during each interval of the cycle of drum rotation. Inasmuch as the solid particles undergo a constant cascading motion all of the entrained solution is exposed to the displacing action of the counterflowing wash liquid.

The configuration of the spiral element of the scoop is characterized also, in accordance with this invention, by decreasing cross sectional area of the labyrinthine path as the solids move inward toward the axially centered discharge part. In this way the solids approaching the discharge are subjected to the highest velocity of the counterflowing solution and the path of the solids inward along the labyrinth is a converging one and the path of wash liquid is a divergent one. This and the increasing velocity contribute to efficient washing without excessive carryover of slimes with the wash liquid.

It is still another object of this invention to provide such process and apparatus in which different processing conditions, including different liquid media, different gaseous atmospheres, different temperatures, etc., can be maintained in the respective cells through which the solid is moved, and this while permitting flow of solids and also liquid from one cell to the next.

Other objects and advantages of this invention will be apparent from the following detailed description thereof taken with the accompanying drawings in which:

FIGURE 1 is a perspective view, partly broken away, to show the interior construction of a multi-cell drum illustrative of a preferred embodiment of this invention;

FIGURE 2 is a vertical section through the drum of FIGURE 1 showing the liquid level in the respective cells from right to left, viewing this figure;

Figure 10:
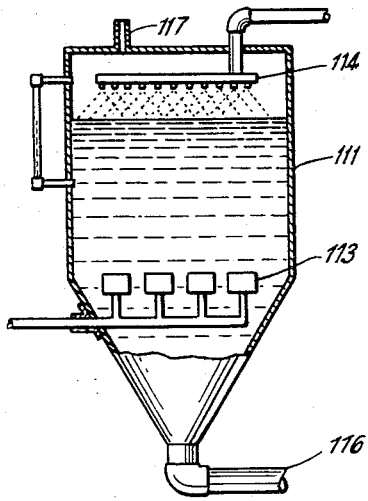
Figure 11:
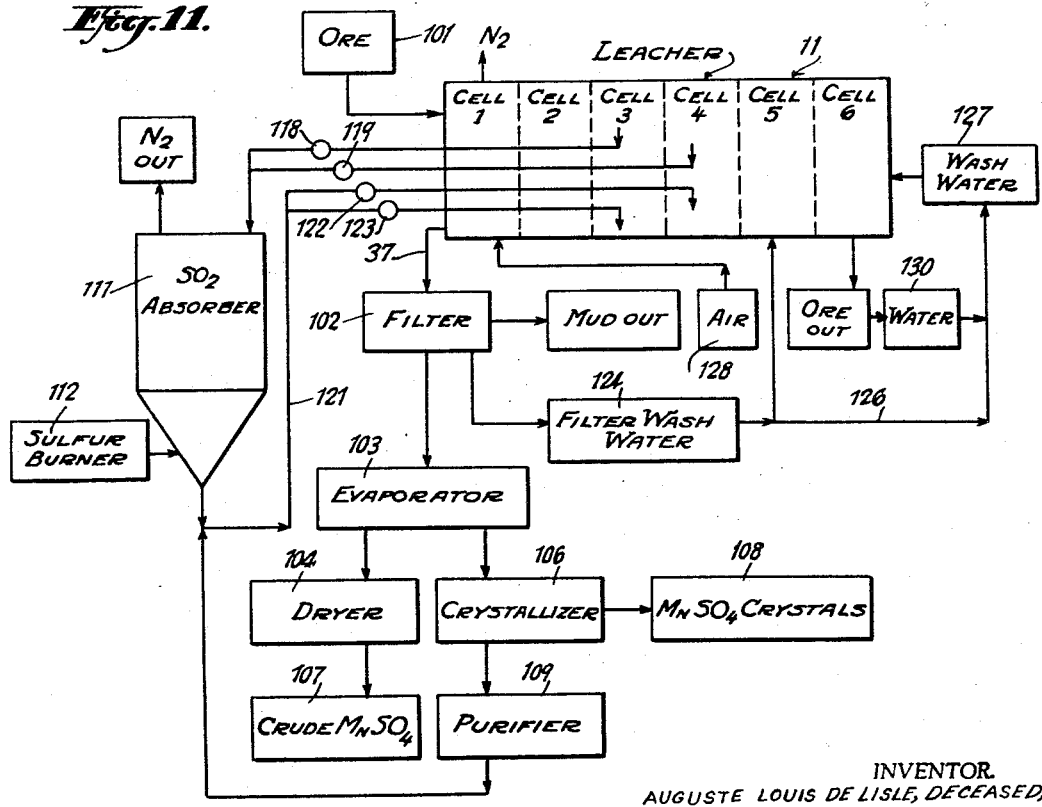

FIGURE 3 is a fragmentary sectional view, taken in the direction of the length of the drum, showing the structure of one of the scoops for effecting transfer of solid material from one cell to the next, the exit opening of which scoop in combination with the body of liquid maintained in the cell containing this scoop provides a liquid seal between adjacent cells which permits flow of solids and liquid through this seal, all as pointed out more fully hereinafter;

FIGURE 4 is a vertical section, taken in a plane indicated by line 4—4 on FIGURE 3, which plane is at right angles to the direction of the plane in which FIGURE 3 is taken;

FIGURES 5, 6, 7 and 8 are vertical sections on a reduced scale as compared with the scale of FIGURES 3 and 4 showing four different positions of a scoop in the operation of the apparatus;

FIGURE 9 is an elevation, partly in section, on a reduced scale as compared with the scale of the other figures, illustrating one preferred embodiment of equipment for maintaining super-atmospheric pressure conditions in the respective cells and for supplying solid material to one end of the drum and withdrawing pregnant liquid from that end and supplying fresh liquid to the opposite end of the drum and withdrawing the leached solids from that end of the drum;

FIGURE 10 is an elevation, partly in section, illustrating one form of diffusing device for diffusing sulfur dioxide in the liquid to produce the acid solution employed in certain of the cells for leaching manganese ore; and FIGURE 11 is a flow sheet indicating schematically one preferred process involving different conditions in certain of the cells which can be carried out in the apparatus herein disclosed, which process involves the leaching of manganese ores to produce manganese sulfate and/or manganese dithionate.

Referring now to the drawings and particularly to FIGURES 1 and 2, the embodiment of the invention here disclosed comprises a relatively long horizontal drum 11 rotatably mounted on suitable rollers 12 supported by a suitable base 13 and adapted to be driven from a suitable source of power 14 through a spur gear 16 and a ring gear 17 at one end of the drum.

In the embodiment of the invention shown for illustrative purposes the drum 11 is divided into six closed compartments formed by the drum heads 18 and 19 at the ends of the drum and a plurality of spaced annular bulkheads 21, 22, 23, 24 and 25, extending transversely to the longitudinal axis of drum 11. The six cells so formed are indicated by the reference characters 27, 28, 29, 30, 31 and 32. Suitably sealed manholes 33 can be provided for access to individual cells. The number of cells, of course, can vary depending upon the intended use of the equipment.

The description which follows will be confined largely to the disclosed embodiment of a longitudinally elongated drum having six side by side cells 27 to 32, inclusive. For convenience in describing the invention, cell 27 will be considered the first or forward cell and the succeeding cells as rear cells relative to cell 27, cell 32 being the rearmost cell. In the preferred embodiment of the invention, cell 27 is the forward cell from the standpoint that it represents the forward cell into which the liquid flows, i.e., the liquid flows from the rearmost cell 32 to the forward cell 27. Employing this equipment as preferred for effecting extraction or leaching with the liquid flowing for the most part in a countercurrent direction to the direction of flow of the solids, the liquid flows, as noted, from the rearmost cell 32 to the forward cell 27, the pregnant liquid exiting from cell 27, and the solids flow from the forward cell 27 into and through the cells 28, 29, 30, 31 and 32, the rearmost cell, the denuded solids exiting from cell 32. If desired and as explained more fully hereinafter, the liquid can be withdrawn from an intermediate cell and fresh liquid or different liquid media supplied to one or more intermediate cells.

As best shown in FIGURES 2 and 3, the bulkheads as well as the drum heads 18 and 19 are each provided with a central opening 34. Preferably these openings in the bulkheads of successive cells are of gradually decreasing diameter in the direction of forward flow of liquid. This is best illustrated in FIGURE 2 from which it will be seen that the diameter of the central opening 34 of the bulkhead in cell 32 is appreciably greater than that of the bulkhead in cell 27 and that the diameters of the openings 34 of the respective bulkheads gradually decrease from one cell to the next. Opening 34 between each pair of adjacent cells provides passageway for the movement of both the liquid and solid constituents from one cell of the pair to the next; the openings 34a in the drumhead 18 provides a passageway for the exit of liquid from and the entry of solids into cell 27. The opening 34b (FIGURE 2) in the drumhead 19 in cell 32 provides a passageway for the entry of liquid to and exit of solids from cell 32 in the embodiment shown in the drawings. All of these openings are liquid sealed, as hereinafter more fully described, to maintain the gas space above the level of liquid in one cell completely isolated from the gas space in the adjoining cells and in the case of end cells 27 and 32 from the atmosphere. These liquid seals are identified in FIGURE 2 by the reference characters LS1, LS2, LS3, LS4, LS5, LS6 and LS7 for the ore inlet to and liquid outlet from cell 27, the respective cells 27, 28, 29, 30, 31 and 32 and the denuded ore outlet from and liquid inlet to cell 32, respectively.

The ore or other material to be processed in particulate or crushed condition is delivered to hopper 36 from a suitable source of supply. From hopper 36 the ore is picked up and introduced into the cell 27 as will be hereinafter more fully explained. The pregnant liquid is discharged into this hopper 36 from which this liquid is withdrawn through a discharge pipe 37 for further treatment.

The transfer mechanism for moving solids from cell to cell, also liquid from cell to cell, through the liquids seals associated with the central opening in the bulkheads defining the ends of the cells and to feed the solids into the forward cell 27 through the liquid seal LS1 which maintains cell 27 isolated from the exterior atmosphere, and to discharge solids from the rearmost cell 32 through the liquid seal LS7 which isolates cell 32 from the atmosphere, will now be described. The transfer mechanism for each cell and for the feed of solids to the cell 27 and the discharge of solids from cell 32 is substantially the same; hence the structure of only one will be described in detail.

Surrounding each opening 34 and integral with the bulkhead or drumhead, as the case may be, is a drum-like projection 41–42 (FIGURE 3) of annular shape, the inner wall of which is closed except for a passageway 43 (see FIGURE 4) extending about 90° of the inner wall 42. This inner wall 42 is congruent with the outer periphery of the opening 34; it encloses opening 34 except where passageway 43 is located. Commencing at one end of the passageway 43 in inner wall 42 is a convolute or spiral passageway 44. The inner end of this spiral or convolute passageway 44 surrounds and leads from the drum-like projection 41 best seen in FIGURE 3. Spiral passageway 44 extends circumferentially from the passageway or opening 43 a distance, preferably more than 360°, desirably terminating at a point in alignment with an end wall 43′ of passageway 43 in inner wall 42, as shown in FIGURE 4. A cover plate 46 is secured as by welding to the drum-like projection 41. Thus in effect a "snail shell" or spiral shaped scoop 47 is associated with each opening 34 having a shovel-like forward or mouth end 48 and a spiral or convolute passageway 44 preferably extending for more than 360°, e.g., from 360° to 390° from the passageway 43.

Suitably each scoop 47 terminates as shown some distance away from the inner wall of the drum 11, to limit the amount of solids picked up at each rotation of the scoop. In the form shown the scoop is of uniform depth (dimension parallel to the longitudinal axis of the drum) because the cover plate 46 is parallel to the bulkhead or drumhead, as the case may be. The mouth of the scoop 47 may be narrowed or flared, however, to provide a control over the amount of solid material picked up by the scoop upon each rotation thereof.

For introducing liquid or gaseous materials into the cells as required, or withdrawing same from the cells, a tube 49 of suitable diameter is secured at its outside ends appropriately to prevent its turning and carries a bundle of pipes 51 which may enter the tube 49 at either end thereof. The tube 49 passes through each of the openings 34 of the bulkheads and also through the openings 34a and 34b in the drumheads 18 and 19. Pipes 52 projecting upwardly or downwardly in the cells are suitably connected to pipes 51 in the tube 49 as shown in FIGURE 3. Pipes 52 project upwardly when used to deliver a desired gaseous medium to the gas space above the level of liquid in each cell or to withdraw gas from this gas space. Pipes 52 project downwardly when used to deliver gas it is desired to dissolve in the liquid or be distributed in the liquid in the cell. For delivery of liquid to the cell the pipe 52 can have its exit end positioned in either the gas space or project downwardly into the liquid. For withdrawal of liquid from a cell through a pipe 52 in that cell, the end thereof should project downwardly beneath the liquid level therein.

Pipes 51, 52 provide for the supply of different media to maintain different chemical conditions, including different temperatures, in the respective cells of a drum 11 with, if desired, only solids and a small amount of liquid passing from one cell to the next. Liquid can be withdrawn from any cell through the pipes 51, 52 therein, processed if desired outside of drum 11, and residual or processed liquid disposed of as desired or returned to a cell.

The tube 49 containing the pipe bundle 51 is sealed where it passes through each of the bulkheads and also is provided with bearings for the drum and its associated parts, where they revolve about stationary tube 49. As shown, particularly in FIGURES 3 and 4, a seal 53 in the form of a strong sheet of semi-hard rubber, plastic or the like, is secured around its periphery by nuts and bolts 54 which extend through a sealing ring 56 and through the plate 46 to provide a firm seal. On its internal annulus where it is contiguous to the tube 49, the seal 53 is secured by bolts 57 passing through a ring 58 and threaded into a bearing housing 59. A suitable frictionless bearing is secured between the housing 59 and the tube 49 and comprises inner and outer races 61 and 62, respectively, with suitable bearing members such as balls 60.

Since the pressure within the cells may vary, a special lubricating system is provided for the bearing surfaces comprising a balloon 63 mounted in any convenient location such as on the plate 46 with a grease line 64 running from the balloon to a vent 66 exterior of the drum. A grease line 67 also runs from the balloon 63 to its associated bearing. The balloon 63 is formed of suitable resilient material, such as relatively thick-walled, semi-soft, resilient rubber, and is normally filled with grease through the fitting 66. The pressure of the grease in the system will then be generally equivalent to the pressure within the cell, so that there will be no tendency for the pressure within the cell to expel grease and any pressure rise within the cell will have a tendency to cause an increased rather than a decreased grease supply to the bearings. The function, in other words, is to establish an equilibrium in the grease system approximately equivalent to the grease condition encountered when a bearing and its grease supply systems are both at ambient atmospheric pressure.

Running longitudinally of the drum and secured to its side wall are a plurality of lifting baffles 72 dimensioned in accordance with particular requirements but functioning to impart agitation, stirring and mixing action of the contents of the cells, and contact between the solid, liquid and gas phases of a reaction system. Where the baffles 72 run the full length of the drum, where, for example, a stilling area in the drum is not desired, the several scoops 47 in the drum functioning to transfer solid material from one cell to the next are dimensioned to clear the baffles 72.

The scoop in any compartment or cell may be considered typical and may be assumed to be of identical mechanical construction in each of the cells. It is shown in four different turning positions in FIGURES 5, 6, 7 and 8. In FIGURES 5, 6, 7 and 8 they are shown in relation to scooping solids from the bottom of the cell.

In FIGURE 5, the scoop is shown with its opening essentially at the center of the bottom; in FIGURE 6, at a quarter revolution later, a certain amount of solid matter has been picked up by the scoop. In FIGURE 7, another quarter revolution later, it will be seen that the solid sludge or pulp has worked its way into the labyrinthine passage and in FIGURE 8, a further development of this washing of the solid is shown.

With this structure of scoop or this position of scoop as shown in FIGURE 5, there is nothing to restrain the flow of solution from the adjacent compartment directly into the first compartment without causing the solution to flow through the interstitial space within the pulp. However, this liquid flow is limited by a tendency of the liquid flow to go in the opposite direction and so on.

In FIGURE 6 the solid contents of the scoop form a seal and the counterflowing solution must pass through the interstitial space while the particles undergo a cascading motion.

In FIGURE 7 the solution continues to flow through the cascading solids which in this position have begun to pour over into the adjacent cell. This causes an increase in pressure on the upstream compartment which causes an increase in the flow rate of the counterflowing solution with maximum washing action. There is a corresponding decrease in velocity in the adjacent cell downstream which is in the position illustrated in FIGURE 6, this tends to restrain the flow of the counterflowing solution during the FIGURE 6 position.

In the position illustrated in FIGURE 8 the discharge of solids is nearly complete but there is still some degree of sealing by the solids which remain trapped in the spiral near the discharge end of the labyrinth. The scoop now begins to bite again into the solids to begin a new cycle.

The operation of the scoops and associated liquid seals for maintaining the respective cells sealed from each other and the end cells from the surrounding atmosphere insofar as the gaseous atmospheres maintained therein is concerned, while permitting and accomplishing intermittent feed of solids from cell to cell and liquid from cell to cell, will now be described, with particular reference to FIGURES 2 and 5 to 8, inclusive, of the drawings. FIGURES 5 to 8 shows the scoop 47 in four different positions corresponding to about 90° angular rotations of the drum. The relative angular positions of the scoops in the respective cells with respect to the axis of rotation can differ depending upon the particular reaction carried out in the equipment and the desired flow from and into each cell of liquid and solid. Generally, good treatment results are obtained when the position of the scoop varies from cell to cell circumferentially a distance equal to 360° divided by the number of cells in the drum. Thus, if there are six cells the scoops may be circumferentially displaced from each other, from one cell to the next, by 60°. It should also be noted that if there are six cells there will normally be seven scoops, but the scoop engaging within the solid material feed hopper 36 can be aligned with the scoop in cell 27. Alternatively, the seven scoops could all be equally spaced around the 360° circumference.

As best shown in FIGURE 1, liquid is supplied to cell 32 through a line 73 leading into a container or bin 74 into which denuded ore is discharged from cell 32. In the preferred embodiment illustrated in the drawings, container 74 and line 73 are provided with a suitable liquid level control to supply liquid to container 74 through line 73 whenever the level of liquid 76 (FIGURE 2) in container 74 falls below a predetermined level, above the necessary level to maintain the liquid seal LS7 sealing opening 34b in the drumhead 19. Thus the liquid level 76 is maintained substantially constant, and the supply of liquid to container 74 regulated, in accordance with the rate of flow from cell to cell and discharge of pregnant liquid from cell 27 to maintain the respective liquid seals LS1–LS7 between adjoining cells and between the end cells and the atmosphere contiguous thereto and also to maintain a static head of liquid in container 74 somewhat greater than the head from cell 32 (the static head in cell 32 plus the dynamic head created by the rotation of the scoop in cell 32) and in each cell a head somewhat greater than that in the next forward cell, i.e., the static head of liquid in cell 32 is somewhat greater than that in cell 31, that in cell 31 is somewhat greater than that in cell 30, etc.

In operation where little or no gaseous atmosphere is maintained in the cell, it is evident that the level of liquid in cell 76 is above the level defined by the extreme of the diameter of the cylinder 11. Operation of the device or apparatus with a gas in the several cells or with essentially no gas in the cells is the same. The only real difference is in the fact that the level of liquid in the control inlet, namely, level 76, is set at the appropriate point. Where operation with a gas atmosphere is desired, introduction of gas into the separate cells serves to maintain the level of liquid desired in the particular cell.

In FIGURE 2, the arrows and L indicate the overall direction of liquid flow. It will be noted that the liquid level in container 74 is the overall outside control for the level in the cells and that no cell can have a level of liquid higher than that shown in 74. With gaseous operation or operation with a gaseous atmosphere in each cell, the level in each cell is progressively lower as progress is made to 32 to 31 to 30 to 29 to 28 to 27. In all forms of operations, the liquid level is maintained high enough in each cell to hold the liquid seal identified as LS6, LS5, LS4, LS2 and LS1 as progression is made from cell 32 to cell 27.

The more important factors controlling flow of liquid and solids through the cells in drum 11 with the scoop 47 extending circumferentially for more than 360° from passageway 43, as shown in FIGURE 4, are (1) the static head of liquid in one cell relative to that in the next; (2) the dynamic head or pumping action created by each rotating scoop 47 in the cell containing that scoop relative to the static head of liquid in the cell communicating therewith through the liquid seal between the two cells; and (3) the changing position of the mouth end of each scoop relative to the body of liquid in which the scoop rotates during each complete revolution. This dynamic head, of course, depends on the rate of rotation of the drum which is the same as the rate of rotation of each scoop 47. For example, in the case of a cell one foot wide (the distance between adjacent bulkheads) having a scoop each convolution of two inch radius, the static head in one cell required to balance the pumping action of the scoop in the adjacent cell when the drum is rotating 10 revolutions per minute is about two inches of liquid (generally water or extractant solution); the total static head required in container 74 for such six cell unit so operating is about twelve inches. The pulp density (i.e. the density of the sludge being worked through the apparatus) affects the magnitude of the static head required to balance the dynamic head.

While gradually decreasing static heads of liquid from rear cell 32 to forward cell 27 are to be expected, preferred operation is with full cells so that differences of static head may be ignored.

In the preferred embodiment illustrated in FIGURES 2 to 8, inclusive, liquid passes from the rear cell 32 to the forward cell 27, as shown in FIGURE 2 and as hereinabove described. The drum 11 is rotated at a rate to move desired amounts of solid particles from cell to cell. The pumping action of the scoops thus creates a dynamic head of liquid in each cell which is overcome (a) by maintaining the cells full of liquid in the direction of solids flow, and (b) by the static head in container 74. With the scoops in adjacent cells 60° apart in their relative position, it will be appreciated that substantially the same flow takes place in all cells except that the flow in one cell is 60° out of phase with respect to the flow in the next cell. A description of what takes place in one cell should suffice to indicate what takes place in all.

Actually, the solids cannot move from cell to cell any faster than they are supplied by the ore feeder. The volume capacity of a scoop multiplied by the number of drum revolutions in unit time represents the maximum solids delivery capacity of this scoop. The fraction of this capacity which is delivered to the cell is the volume percentage of the sludge layer in the scoop. Consequently, the ore feed rate in combination with the volume capacity of a scoop and the drum turning speed determine the level of sludge in the cell and in the scoop.

This level should preferably be maintained at between 20 percent and 50 percent of the scoop volume, depending on the number of degrees of the spiral turn to maintain the desired seal and washing efficiency.

If the solids volume changes appreciably due to dissolution as with manganese ore the scoops may be made progressively smaller in the direction of solids movement along the drum. In this way the sludge level may be maintained in the cells and in the scoops despite the diminishing volume and despite the fact that each scoop must turn at the same rotational speed.

Similarly, the graduation of the openings in the bulkhead from one bulkhead to the next should bear some reference to the quantity of solids which is moved through each bulkhead of the series. The progressive decrease together with the decrease in the capacity of the scoop is to maintain an adequate seal in the scoop despite a diminishing of the volume of the solids due to leaching or reaction with the solution.

The description which follows will refer to what takes place in one cell but will use for reference purposes FIGURES 5 to 8 showing 90° differences in position of the scoop in the four cells 27, 28, 29 and 30. For convenience in describing the action of the scoop and the flow, reference will be made to scoop 47 in cell 27 communicating with cell 28 through the liquid seal LS2. The scoop 47 in moving 90° from the FIGURE 8 to the FIGURE 5 position in cell 27 starts to scoop up the solids S and may pump some liquid derived from cell 28 (i.e., liquid from cell 28 which has previously filled it) back into cell 28 through seal LS2. Rotation through the next 90° from the FIGURE 5 position to the FIGURE 6 position continues to scoop up solids and when the rate of rotation is fast enough, continues to pump some liquid from the scoop into cell 28 through seal LS2. During rotation through 180° from the FIGURE 8 to the FIGURE 6 position, the mouth or shovel end 48 of the scoop is immersed in the liquid in cell 27 and the pumping action of the scoop is opposed by the static head of liquid in cell 28. The latter is maintained sufficiently great to overcome the dynamic pumping head of the scoop in cell 27 so that the net flow of cell 27 liquid back into cell 28 is small.

Movement of the scoop through the 90° from the FIGure 6 to the FIGURE 7 position causes the solid particles in the scoop to settle and move through the spiral passageway 44 towards the opening or passageway 43 in wall 42.

In the FIGURE 7 position a small amount of solid particles may start to spill through passageway 43. The mouth 48 of scoop 47 during this 90° movement is entirely outside the body of liquid in cell 27, within the gas atmosphere above the liquid level and at a higher level than the level of liquid in cell 28. Hence no liquid can flow between cells 27 and 28 in either direction during this 90° movement of the scoop in cell 27.

Movement of the scoop through the remaining 90°, i.e., from the FIGURE 7 to the FIGURE 8 position, is in a direction to favor, under the influence of gravity, liquid flow from the mouth of the scoop into cell 27 from cell 28. During this movement the solids continue to setle through the spiral passageway 44, spill through the opening 43 into drum 41 through opening 34 into cell 28. Substantially all solid particles scooped up during each rotation are transferred from cell 27 to cell 28 through liquid seal LS2 during this rotation from the FIGURE 7 to the FIGURE 8 position and during a small portion of the initial rotation from the FIGURE 8 to the FIGURE 5 position. Thus solid particles are fed during about 90° to 120° of each complete rotation of the scoop. Liquid flows from cell 28 to cell 27 through the liquid seal LS2 under the influence of the increased head of liquid in cell 28, created by the supply of liquid thereto from cell 29 during the stoppage of flow from cell 27 while the scoop in cell 27 is traveling from the FIGURE 6 to the FIGURE 7 position. The forward flow of liquid from cell 28 to cell 27 is at its maximum during movement of the scoop in cell 27 from the FIGURE 7 to the FIGURE 8 positions of this scoop. Moreover, this maximum forward flow through the liquid seal LS2 takes place while the solids are moving in a countercurrent direction through the seal with consequent efficient leaching or extraction of the solids with the liquid.

From the above description, it should be evident that in the preferred embodiment, for each 360° rotation of a scoop, forward flow of liquid with countercurrent flow of solids through the liquid seal between contiguous cells takes place for about 90° to about 120°; some back flow of scoop liquid with substantially no solid flow takes place for about 180°; and no flow of either liquid or solids from one cell to the next takes place for about 90°.

With the spiral pasageway 44 extending for more than 360° from the passageway 43 in a circumferential direction a distance approximately equal to the radius of the drum 41, the flow of liquid forward is stopped for 90° of each complete rotation of the scoop 47 as hereinabove described. By shortening the circumferential extent of this scoop, for example, by having it extend 360° from passageway 43, forward flow of liquid, when operated as hereinabove described, is stopped for about 45° of each rotation of the scoop. Should continuous liquid flow between adjacent cells be desired, this can be accomplished by shortening the circumferential extent of the scoop so that it extends less than 360° by a distance slightly more than the radius of drum 41.

It will be further noted that the difference in static heads of liquids in adjacent cells is small. Due to the back flow of scoop liquid during about 180° of rotation of the scoop, when it is submerged in the liquid, and the supply of liquid from a rear cell to an intermediate cell while no liquid flows from a forward cell to the intermediate cell, the total head difference is at its maximum when the forward flow of liquid commences, i.e., in the FIGURE 7 to FIGURE 8 scoop position.

One important feature of the present invention is its flexibility in operation, permitting different flows of liquid and solid depending upon the rate of rotation, the materials treated, i.e., the reactions carried out, and the scoop design as hereinabove disclosed.

In FIGURES 5, 6, 7 and 8, the operation of the device is illustrated under a given set of conditions. While it is possible and at times desirable to operate with an atmosphere of selected gas above liquid in a partially filled cylinder wherein the filling extends to a level above the axis of rotation, it is generally found at least as convenient to operate with the drum essentially full of liquid as shown in the drawings. In such a situation, the spiral labyrinthine scoop finds it way into the solid-liquid sludge contained in the cells and the sludge works its way through the labyrinth into the next chamber. In the course of a sequence of revolutions, it is also washed by the liquid.

While it is evident that the illustrations are made for showing the washing of ore where it is assumed the specific gravity of the ore is greater than that of water, or the wash or reactant liquid, with the result that the sludge tends to settle on the bottom, it is evident that the difference in specific gravity between the liquid and solid being washed can drop to the vanishing point and, in fact, in certain instances, involving the washing of light, porous ores, the specific gravity of the solid can be less than that of the liquid so that the solid will float. A specific instance of this is in the washing of ice crystals in refrigeration processes used to desalinize sea water. In an operation of this kind, sea water is frozen quickly to generate a large quantity of ice crystals and the ice-salt water sludge is then commonly centrifuged to separate the salt water from the solid ice crystals.

The apparatus illustrated in FIGURES 5, 6, 7 and 8 can be used for washing ice crystals in exactly the manner illustrated. The physical pictorial mechanics of operation and the relationship of ice crystals to water are readily perceived merely by turning FIGURES 5, 6, 7 and 8 upside down.

It will be apparent thus that when the apparatus is in operation using a wash liquid in which the sludge, or the solid material, frequently referred to as pulp in this specification, consists of a substance which has a specific gravity less than that of water or less than that of the pregnant liquid in which it is being washed, the pulp will float to the top. The apparatus, under these conditions is just as effective as it is when the pulp sinks to the bottom or actually is substantially suspended in the liquid. That is, the apparatus with the labyrinthine cell, is capable of giving a positive concentrating motion or direction to the solid content of the pulp and at the same time separate the liquid therefrom essentially by "drilling" through the sludge.

While not preferred, the apparatus can be operated with cocurrent flow of liquid and solids through the respective cells. This necessitates changing the apparatus shown in the drawings to supply liquid through pipe 37 which then becomes a liquid supply pipe rather than a discharge pipe. Also, the rate of supply of fresh liquid to hopper 36 and the rate of discharge of pregnant liquid from the container 74 which then becomes the discharge container, are controlled to maintain static heads of liquids in all cells and in the ore feed hopper 36 and container 74 at least to provide the liquid seals LS1, LS2, LS3, LS4, LS5, LS6 and LS7. The static head of liquid in the ore hopper 36 is sufficient not only to provide a liquid seal for the opening 34a through which the ore is fed by the scoop positioned in the ore hopper 36 into cell 27 but also somewhat greater than the static head of liquid in cell 27 so that liquid flow takes place from hopper 36 to cell 27. When operating in this manner the dynamic head of liquid created by each scoop augments the static head of liquid in the cell in which the scoop is positioned giving cocurrent flow of liquid and solids from cell to cell with the flow of the liquid taking place for approximately 180° of each rotation of the scoop and flow of the solids through about 90° of rotation of the scoop, i.e., from approximately the FIGURE 7 to and through the FIGURE 8 position.

With cocurrent flow of liquid and solid particles, all openings 34, 34a and 34b can be of the same diameter or graduated in diameter from 34a the largest diameter to 34b the smallest diameter.

Referring now to FIGURE 9 which shows an embodiment of the invention arranged for operation under superatmospheric pressure conditions within all of the cells, the construction of drum 11 and the manner of effecting rotation thereof can be the same as disclosed in connection with FIGURE 1. Hopper 36, however, is enclosed in a feed chute 84 containing two inverted frusto-conical members 86 and 87 adapted to be closed by valves 88 and 89 mounted on a vertical rod 91 and sleeve 92, respectively. While the showing in FIGURE 4 is simplified for purposes of illustration, this type of equipment is known and is normally operated cyclically with suitable control equipment so that when one valve is opened the other is closed. Thus, the solid material being fed will first be retained in the portion of the hopper above valve 89 and dropped to the portion of the hopper above valve 88 when valve 89 is opened and valve 88 is closed. When this valve 89 is closed and valve 88 is opened, the material within drops into the hopper 36, and since the valve 89 is closed, a seal between the interior of the drum and atmosphere is maintained.

In a generally similar manner the discharge chute 81 is sealed into a hopper 93 having the inverted frusto-conical bottom members 94 and 96 adapted to be closed by valves 97 and 98 respectively. As at the forward end, these valves are separately operated through suitable equipment connected to a rod 99 and sleeve 100, making it possible to deliver material from the hopper 93 without affecting the pressure within the cells in drum 11.

FIGURE 10 of the drawings shows one form of absorber for producing sulfur dioxide solution useful in the treatment of manganese ores. This absorber contains a body of liquid supplied through a spray 114 into which is diffused sulfur dioxide from a sulfur burner 112. The sulfur dioxide passes through diffuser head 113 and is absorbed by the body of liquid in absorber 111. As noted, replenishing liquid is supplied through a spray 114. The liquid containing sulfur dioxide is withdrawn through a pipe 116. Nitrogen from the burning of the sulfur escapes through a vent 117.

Referring now to FIGURE 11 which is a flow sheet showing one preferred arrangement of equipment for extracting manganese values from ores containing manganese oxides using a drum 11 containing 6 cells, identified in this figure as cell 1, cell 2, cell 3, cell 4, cell 5 and cell 6, respectively, which cells are the same as cells 27 to 32, inclusive, hereinabove described. In this embodiment of the invention the latter cells 5 and 6 receive wash water for completing the leaching or washing of the ore which has been treated in cells 1 to 4, inclusive, as hereinafter described, and from which most of the manganese values had been recovered before the ore enters cell 5. All of the wash water obtained by washing the ore with water at 130, admixed with the filter wash water obtained by washing the mud separated from the filtrate produced by filtering at 102, the pregnant liquid removed from cell 1, can be introduced into the container supplying cell 6 or a portion introduced into this container or directly into cell 6 and the remainder into cell 5 as indicated in FIGURE 9. The supply should be so effected as to maintain the static heads of liquid in these cells 5 and 6 and the liquid seals LS5, LS6 and LS7 to isolate the gas space of one cell from the adjacent cells as hereinabove described. The extracting medium used in cells 5 and 6 for all practical purposes is substantially the same; in cell 6 it is wash water which dissolves the residual manganese sulfate adhering to the ore entering cell 6; in cell 5 the wash water contains somewhat more manganese sulfate removed from the ore entering cell 5 than does the wash water in cell 6.

In cells 3 and 4 relatively low pH's (highly acidic conditions) are maintained by continuously removing liquid from these cells through exit lines communicating with pumps 118 and 119, which liquid is pumped into the sulfur dioxide absorber 111 and by means of pumps 122 and 123 fresh sulfur dioxide liquid from the absorber 111 is pumped into cells 3 and 4. The volume of liquid withdrawn is approximately equal to that reintroduced, thus not altering the forward flow of liquid from cell 4 into cell 3 and from cell 3 into cell 2 while maintaining a high sulfur dioxide concentration in the liquid in cells 3 and 4 found most effective for removing higher manganese oxides from the ore.

Cell 2 receives liquid from cell 3 and enables the reactions between sulfur dioxide and manganese oxides and between sulfuric acid and manganese oxides to go to near completion in cell 1. The pH of the liquid in cell 2 is appreciably higher than the pH of the liquid in cells 3 and 4, i.e., cells 3 and 4 are more acid. In cell 1 ore is introduced from source 101 and air or oxygen containing gas is introduced from source 128 maintaining an oxidizing atmosphere in the liquid. The oxygen thus introduced enables reaction to take place in this cell to form sulfuric acid which in turn reacts with the manganese oxide to produce manganese sulfate. In cell 1 manganese oxide reacts with sulfur dioxide and oxygen to form manganese sulfate, $N_2$ when air is used to supply the oxygen is vented through the outlet marked $N_2$.

The equations indicative of the reactions which take place are as follows:

(1) $MnO_2 + SO_2 = MnSO_4$
(2) $MnO_2 + 2SO_2 = MnS_2O_6$
(3) $H_2O + SO_2 + \frac{1}{2}O_2$ (Mn catalyst) $= H_2SO_4$ (Mn catalyst)
(4) $MnO + H_2SO_4 = MnSO_4 + H_2O$
(5) $MnO + SO_2 + \frac{1}{2}O_2$ (aqueous) $= MnSO_4$
(6) $Mn_2O_3 + H_2SO_4 + SO_2 = 2MnSO_4 + H_2O$
(7) $Mn_2O_3 + H_2SO_4 + 2SO_2 = MnSO_4 + MnS_2O_6 + H_2O$
(8) $Mn_3O_4 + 2H_2SO_4 + SO_2 = 3MnSO_4 + 2H_2O$
(9) $Mn_3O_4 + 2H_2SO_4 + 2SO_2 = 2MnSO_4 + MnS_2O_6 + 2H_2O$ Thus it will be noted the liquid in the six cells is of different chemical composition; that in cells 5 and 6 is chiefly a solution of manganese sulfate or manganese dithionate or both with the solution more concentrated in cell 5 than in cell 6; the liquid in cells 3 and 4 is a low pH reaction mixture containing $SO_2$ and sulfuric acid as well as manganese sulfate and dithionate; the liquid in cell 2 is a higher pH aqueous solution of manganese sulfate and/or dithionate; and the liquid in cell 1 is a concentrated solution of manganese sulfate and/or dithionate maintained in an oxidizing atmosphere produced by bubbling air or oxygen containing gas through this liquid in cell 1.

This concentrated solution or pregnant liquid flows from cell 1 into the feed hopper 36 and thence through the discharge pipe 37 into filter 102 (FIGURE 11) where the mud or suspended solid particles are separated from the liquid by filtration. The solid particles or mud are washed with water at 124 and the wash water, as above described, pumped through line 126, mixing with the wash water employed to wash the denuded ore, the resultant mixture being introduced into cell 6 shown in FIGURE 11. The filtrate from filter 102 can be fed to an evaporator 103 from which the solid manganese sulfate and/or manganese dithionate is fed to a drier 104. The dried product can be introduced into the crude manganese sulfate storage 107. Alternatively, evaporator 103 can be operated to produce a concentrated solution fed to crystallizer 106 from which the manganese sulfate is crystallized and sent to storage at 108. The mother liquor can be purified in purifier 109 and mixed with the aqueous sulfur dioxide containing stream in line 121 which communicates with pumps 122 and 123 discharging into cells 3 and 4, as hereinabove described. Treatment of the pregnant liquid by evaporation and drying is employed when an agricultural product is desired and the filtrate from filter 102 does not contain appreciable quantities of phyto-toxic materials.

The above represents one of many different processes which can be carried out in the respective cells with the feed of solid particles and liquid from cell to cell and the solid particles processed in each cell with desired different gases and/or liquids. The reactions can be carried out in different cells at different optimum temperatures by applying heat to the respective cells, for example, by introduction of steam through one or more of the tubes in the tube bundle 51 through one or more of the inlet tubes 52 individual to certain of the cells. The gaseous atmosphere above the liquid in each cell can be maintained or changed by introducing the desired gas through the appropriate tube of the tube bundle 51 communicating with an exit tube 52 individual to the cell in which it is desired to introduce the gas. The number of cells provided in a single drum and the specific arrangement of piping to and from each cell employing tube bundle 51 can be adjusted to fit the process carried out in the equipment. Processing in one and the same drum in the different cells thereof can be carried out in some cells at ambient atmospheric pressure and others at somewhat higher pressure as long as the differential pressure is such as not to break the liquid seals maintaining the adjacent cells isolated from each other.

Illustrative of types of operations which can be performed in accordance with the present invention are gold cyaniding with hydrocyanic acid gas (HCN) for gold recovery; relatively high temperature ammonia leaching of copper from carbonate ores where the gangue is a carbonate; leaching of oxidized copper ores with sulfuric acid; leaching of mill concentrates of copper and other ores, when the mineral is difficultly soluble, as in the case of copper sulfide, where reagents such as other metals (iron in the case of copper) and gaseous reagents such as ammonia ($NH_3$) or oxygen ($O_2$ or air) are suitably introduced in accordance with known chemical reactions to recover metal values in an economically usable form; leaching by hot high pressure ammonium chloride solution of tungsten ores; leaching of complex ores of the transition elements by ammonium chloride or a selected acid; leaching of various materials under pressure with chlorine gas; and various organic processes, such as the leaching of quebracho chips to recover tannic acid where contamination of the tannic acid by oxidation must be avoided to produce a top grade product. By means of the equipment and method of the present invention, ores which are now treated by a combination of processes including smelting, may be processed substantially completely by hydro-metallurgical procedures, with or without electro-winning as a final step, depending on the metal and the required purity of the final metal product.

Also, by means of the method and equipment of the present invention it is possible to wash ice crystals in refrigeration processes for desalinization of sea water.

In connection with all of the metallurgical processes, for most operations involving high tonnage, steel would preferably be used for the construction of the drum and its associated parts. Other materials such as stainless steel, monel metal or clad metals may be employed where contamination or corrosion is a factor. The construction material from which the equipment is made may be tailored to a particular operation. While the equipment is primarily intended for large tonnage movement of materials on which a leaching operation is being performed, the overall equipment size and the dimensioning of the individual cells is also a factor for design consistent with an operation to be performed. Illustratively, the equipment shown, designed to process fifteen hundred tons of manganese ore per day, has a diameter of twelve feet and an overall length of 120 feet, making the individual cells average twelve feet in diameter and twenty feet in length.

The process and equipment of the present invention are designed for substantially continuous operation over a relatively long period of time (i.e., the drum rotates continuously with supply and feed of solids during about 90° of each rotation of each scoop) and therein lies one of the major advantages, particularly when the chemical equilibria involved are of a character heretofore amenable only to batch type operation.

The operation of the present equipment is started by the simple method of rotating the drum and feeding the solid material to the hopper 36, through the special hopper 84 of FIGURE 9 if the process requires the use of pressures above atmospheric, and continuing operation to progressively feed the solid material into all of the cells. If six cells four feet in diameter and four feet long are employed, each cell will normally hold about a ton of ore and the rate of feed will be about one ton per hour. Under these circumstances it will take approximately six hours to initiate full production. As the solid material begins to move into the cells, liquid and reagent delivery are initiated but at a somewhat reduced rate so that pregnant liquid will start to discharge from cell 1 at about the same time that cell 6 starts to discharge solids. During the start-up period all the desired substances may not be removed from the solid material and the pregnant liquid may be somewhat reduced in concentration, as contrasted with results during regular running or steady state conditions. The system very soon reaches equilibrium, however, after the regular movement of liquid and solids has been established.

The present invention adapts itself to reactions of all kinds in which a liquid and solid phase, with or without a controlled gas phase, are employed. The term leaching, as employed herein, includes lixiviation in which a material is directly dissolved by a liquid in which it is soluble, a chemical leaching process in which leaching is accomplished by a chemical reaction rendering an otherwise insoluble constituent soluble in a leaching liquid, or a combination of treatments in which materials are leached from a solid by means of different reactions. In instances where a gaseous constituent is used, it may be dissolved directly in a liquid as in the case of sulfur dioxide in the example given and introduced in aqueous solution into the cells. Such gases as ammonia ($NH_3$), chlorine, sulfur dioxide, or any other gaseous reagent may, however, be introduced into the cells directly through the piping system provided. They will then be available, either at ambient atmospheric pressure or at a pressure above atmospheric for reaction with either or both of the other two phases in the cell (liquid and solid). Intimate contact is promoted through the turbulence created in the cell by its rotation.

So far as the gaseous phase within the cell is concerned it will be recalled that in each cell the liquid level is preferably maintained above the opening in the bulkhead, so that liquid will flow from one cell to the other through the liquid seal associated with each bulkhead during part of the rotating cycle of the drum. The gas space above the liquid in each cell, therefore, is sealed off against loss of gas or vapor. When the entire drum is placed under pressure as in FIGURE 9, the relative static conditions between the cells remain the same, and accordingly the entire system can be operated under pressure where pressure is important to a reaction.

In the drawings I have not shown any specific heating means for the drum, but it should be apparent that any commonly employed heating method can be utilized. Thus, steam may be introduced into the cells, or the liquid reagents or solutions may be heated and introduced into the cells in heated condition, the ore may be heated before introduction to the cell and still other expedients may be used when a particular process is adapted to the use of higher temperatures for more efficient recoveries and accelerated chemical reactions.

Since certain changes in carrying out the above described process and in the apparatus required for its practice can be made without departing from the scope of this invention, it is intended that all matter contained in the above description or shown in the accompanying drawings shall be interpreted as illustrative and not in a limiting sense.

What is claimed is:
1. Apparatus for countercurrent contact of liquid and solid comprising, in combination:
 (a) a longitudinally extending cylinder mounted for rotation;
 (b) a plurality of spaced, transversely extending bulkheads within and rotatable with said drum dividing it into a plurality of side by side cells, the sides of each of which, except the end cells, are defined by adjacent pairs of said bulkheads and the sides of the end cells of which are defined by the end of the cylinder and the bulkhead closest thereto, the ends of said cylinder and said bulkheads each having a central in line opening therein and otherwise providing a gas-tight closure for the cells defined thereby;
 (c) a scoop in each cell fastened to a bulkhead and rotatable therewith, said scoop comprising:
   (1) a drum-like projection on the bulkhead in the cell containing said scoop, said drum-like projection surrounding said opening in said bulkhead; and
   (2) a spiral passageway communicating at one end with said drum-like projection and at the opposite end terminating in a member positioned to engage solid particles upon rotation of the scoop, said spiral passageway extending over a circumferential distance of at least 360°;
 (d) means for supplying solid particles to one end of said cylinder and withdrawing solids at the other end;
 (e) means for supplying liquid to said cylinder at the solid discharge end and withdrawing it at the other end;
 (f) means for maintaining a greater liquid pressure at the liquid inlet end than at the liquid outlet to prevent backflow of liquid;
 (g) means for maintaining a level of liquid in each cell above the level of the openings in the bulkheads defining the sides of said cell to provide a liquid seal for each opening in each of the opposite bulkheads defining the sides of said cells to maintain adjacent cells in gas-tight condition relative to each other while communicably connected through said liquid seals for flow of liquid and solid particles through said liquid seals from one cell to an adjacent cell; and
 (h) means for rotating said cylinder and said scoops whereby each of said scoops scoops up some solid particles immersed in the body of liquid maintained in each cell, and upon rotation of the scoop effects flow of the solid particles through the spiral passageway of the scoop and through said liquid seal into the adjacent cell.

2. Apparatus as defined in claim 1 in which the openings in the bulkheads are graduated in diameter, progressively decreasing in diameter from one bulkhead to the next in a direction opposite to the direction of liquid flow through the respective cells.

3. Apparatus as defined in claim 1 in which the spiral passageway communicating with each scoop in each cell extends over a circumferential distance of from 360° to 390°.

4. Apparatus as defined in claim 1 in which one end of the cylinder has a feed hopper for solid particles adjacent the cylinder, one of said scoops being positioned in said feed hopper with its drum-like projection surrounding the opening in said end of the drum, said opening being sealed by the liquid in said feed hopper, said scoop upon rotation being arranged to collect solid particles from said feed hopper into the first cell, and means for supplying liquid under a steady static head to maintain the level of liquid in the last cell at a height above the longitudinal openings between cells sufficient to maintain the liquid seal in said last cell, whereby the liquid flows from cell to cell countercurrent to the direction of flow of the solid particles from cell to cell.

5. Apparatus as defined in claim 1 in which a drum-like projection is provided on one end of the cylinder, this drum-like projection and those in the cells each having a central opening with the center thereof in longitudinal alignment, a fixed tube extending through all of said central openings providing a bearing support for the drum about which the drum rotates, means for forming a liquid gas tight seal between the periphery of said tube and the walls defining the central openings through which said tube extends, and conduits in said tube extending into said cells, each such conduit being individual to a cell for the supply of medium to the cell from a source exterior of said drum without impairing the liquid seals isolating the cell from the adjacent cell.

6. Apparatus for countercurrent contact of liquid and solid comprising, in combination:
   (a) a longitudinally extending cylinder mounted for rotation;
   (b) a plurality of spaced, transversely extending bulkheads within and rotatable with said cylinder dividing it into a plurality of side-by-side cells, the sides of each of which, except the end cells, are defined by adjacent pairs of said bulkheads and the sides of the end cells of which are defined by an end of the cylinder and the bulkhead closest thereto, the ends of said cylinder and said bulkheads each having a longitudinally aligned central opening therein and otherwise providing a gas-tight closure for the cells defined thereby;
   (c) a scoop in each cell fastened to a bulkhead and rotatable therewith, said scoop comprising,
     (1) a drum-like projection on the bulkhead in the cell containing said scoop, said drum-like projection surounding said opening in said bulkhead, and
     (2) a spiral passageway communicating at one end with said drum-like projection and at the opposite end terminating in a member positioned to engage solid particles upon rotation of the scoop, said spiral passageway extending over a circumferential distance of at least 360°;
   (d) means for supplying solid particles to one end of said drum and withdrawing solids at the other end;
   (e) means for supplying liquid to said drum under a steady static head at the solid discharge end and withdrawing it at the other end;
   (f) means for maintaining a greater liquid pressure at the liquid inlet end than at the liquid outlet to prevent backflow of liquid;
   (g) means for maintaining a body of liquid in each cell at a level above the level of the central opening in the bulkheads defining the sides of each cell to provide a liquid seal for each central opening in each of the bulkheads defining the sides of said cells to maintain adjacent cells in gas-tight condition relative to each other while communicably connected through said liquid seals for intermittent flow of liquid and solid particles through said liquid seals from one cell to an adjacent cell with the flow of liquid during the flow of solid particles in a direction countercurrent to the flow of solid particles through said liquid seals; and
   (h) means for rotating said drum and said scoops whereby each of said scoops scoops up solid particles immersed in the body of liquid maintained in each cell, and upon rotation of the scoop effects flow of the solid particles through the spiral passageway of the scoop and through said liquid seal into the adjacent cell.

References Cited by the Examiner

UNITED STATES PATENTS

| 1,353,463 | 9/1920 | Dyer | 23—269 |
| 1,449,216 | 3/1923 | Davis | 198—215 |
| 1,807,642 | 6/1931 | Vadner | 23—117 |
| 1,835,474 | 12/1931 | De Witt | 23—117 |
| 2,337,137 | 12/1943 | Thompson | 23—269 |
| 3,005,690 | 10/1961 | Prasky | 23—269 |

FOREIGN PATENTS

| 1,050,311 | 2/1959 | Germany. |
| 417,302 | 10/1934 | Great Britain. |

OTHER REFERENCES

Vedensky: "Engineering and Mining Journal," vol. 147, #7, July 1946, pp. 58 to 64.

NORMAN YUDKOFF, *Primary Examiner.*

S. J. EMERY, *Assistant Examiner.*